(12) United States Patent
Odaira

(10) Patent No.: US 6,891,861 B1
(45) Date of Patent: May 10, 2005

(54) COMMUNICATION APPARATUS

(75) Inventor: Masahiro Odaira, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/506,941

(22) Filed: Feb. 18, 2000

(30) Foreign Application Priority Data

Feb. 22, 1999 (JP) .......................................... 11-043433

(51) Int. Cl.[7] .............................................. H04J 3/12
(52) U.S. Cl. ..................................... 370/524; 370/466
(58) Field of Search ................................. 370/522, 524, 370/264, 230, 352–356, 401, 351, 395.2, 410, 448–466; 358/1.2, 102, 103, 107

(56) References Cited

U.S. PATENT DOCUMENTS

| 5,276,687 A | * | 1/1994 | Miyamoto | 370/420 |
| 5,367,522 A | * | 11/1994 | Otani | 370/468 |
| 5,471,317 A | * | 11/1995 | Charbonnier | 358/400 |
| 5,537,404 A | * | 7/1996 | Bentley et al. | 370/384 |
| 5,854,829 A | * | 12/1998 | Hughes-Hartogs | 379/100.12 |
| 5,889,842 A | * | 3/1999 | Azami | 379/93.09 |

* cited by examiner

Primary Examiner—Ajit Patel
(74) Attorney, Agent, or Firm—Fitzpatrick, Cella, Harper & Scinto

(57) ABSTRACT

The present invention improves probability of success in connection by enabling effective re-calling even for such a partner apparatus, exchanger, or network that takes a long time in releasing processing when a connection protocol fails at calling in G4, the line is disconnected and re-calling is performed in G3 (fall-back). A fall-back wait timer is provided for waiting for a predetermined time before re-calling is performed by the fall-back function. With this, at the time of fall-back, next communication can be activated in a sufficient time. Therefore, effective re-calling is possible even for such a partner apparatus, exchanger, or network that takes a long time in releasing processing, whereby the probability of success in connection is improved.

12 Claims, 3 Drawing Sheets

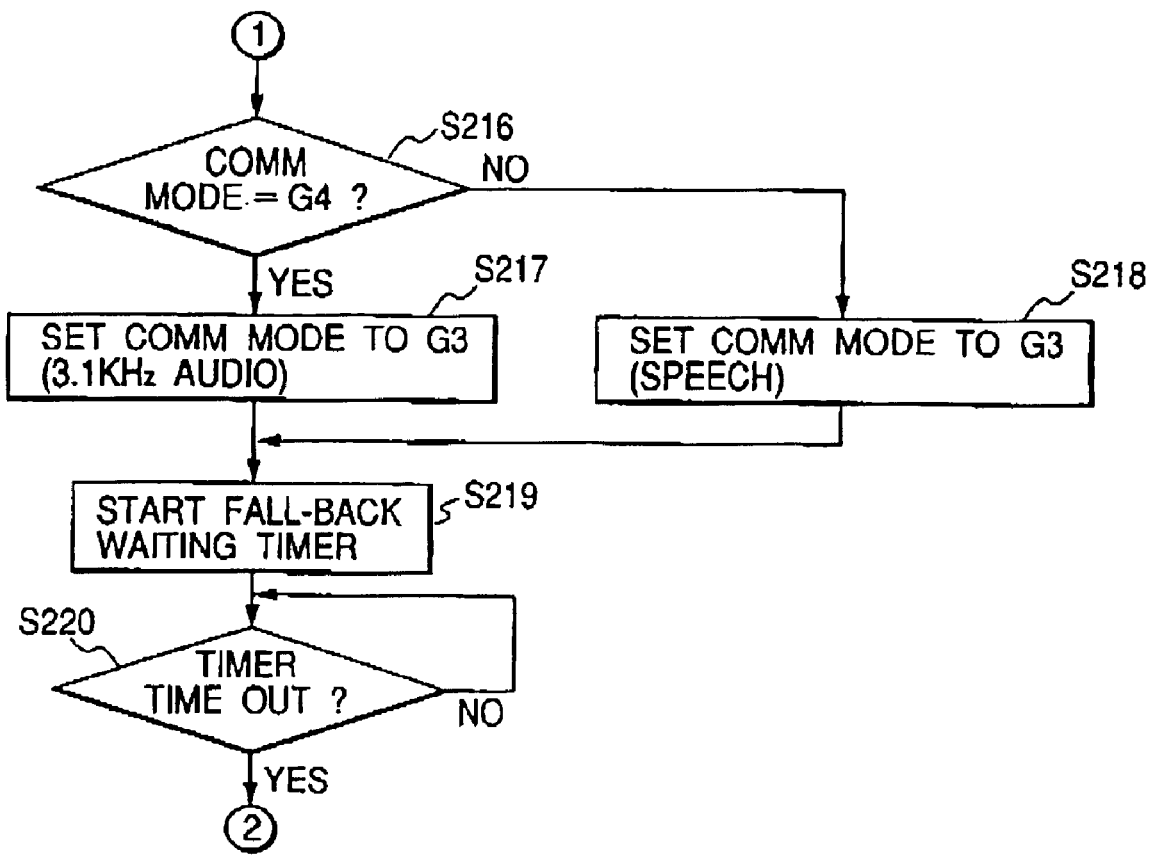

COMMUNICATION APPARATUS

BACKGROUND OF THE INVENTION

1. Field of the Invention

The present invention relates to a communication apparatus which can be connected to ISDN (Integrated Services Digital Network), a method for controlling the same, and a computer-readable storage medium storing a program for the control.

2. Related Background Art

In communication by the use of a terminal (G4 facsimile etc.) connected to an ISDN, a fall-back function has been realized in a conventional facsimile apparatus as an example of such a control method that in a case where a partner apparatus is called with specification of a communication mode (G4-unrestricted digital mode, etc.) in a B-channel thereof, if the communication mode matches, the communication goes on, while if call connection with the ISDN fails due to a mismatch in the communication mode, etc., the communication mode is automatically switched to another mode (G3-3.1-kHz audio mode, etc.) to repeat the procedure.

In the above-mentioned conventional example, however, if call connection with the ISDN fails due to, for example, a mismatch in communication mode (a case where the partner is in a G3-3.1-kHz audio mode when it is called with specification of the G4 non-restricted digital mode, etc.), a fall-back function switches the communication mode into another (G3-3.1-kHz audio mode, etc.) to immediately shift to the call procedure again, so that it may sometimes take too long a time for the partner apparatus, exchanger, or network to be released and thus the partner cannot respond even when called again (i.e., it is in no condition to respond to the calling), whereby the call connection may be impossible even when the communication mode matches.

SUMMARY OF THE INVENTION

In view of the above, it is an object of the present invention to provide a communication apparatus, a method for controlling the same, or a storage medium that enables effective recalling to a partner terminal, exchanges, or network which takes a long time to be released and that improves a rate of successful connection at the time of re-calling.

BRIEF DESCRIPTION OF THE DRAWINGS

FIG. 3 is another flowchart showing the operations of the above-mentioned embodiment; and FIG. 4 gives timer settings of the above-mentioned embodiment.

DESCRIPTION OF THE PREFERRED EMBODIMENTS

Figure 1:
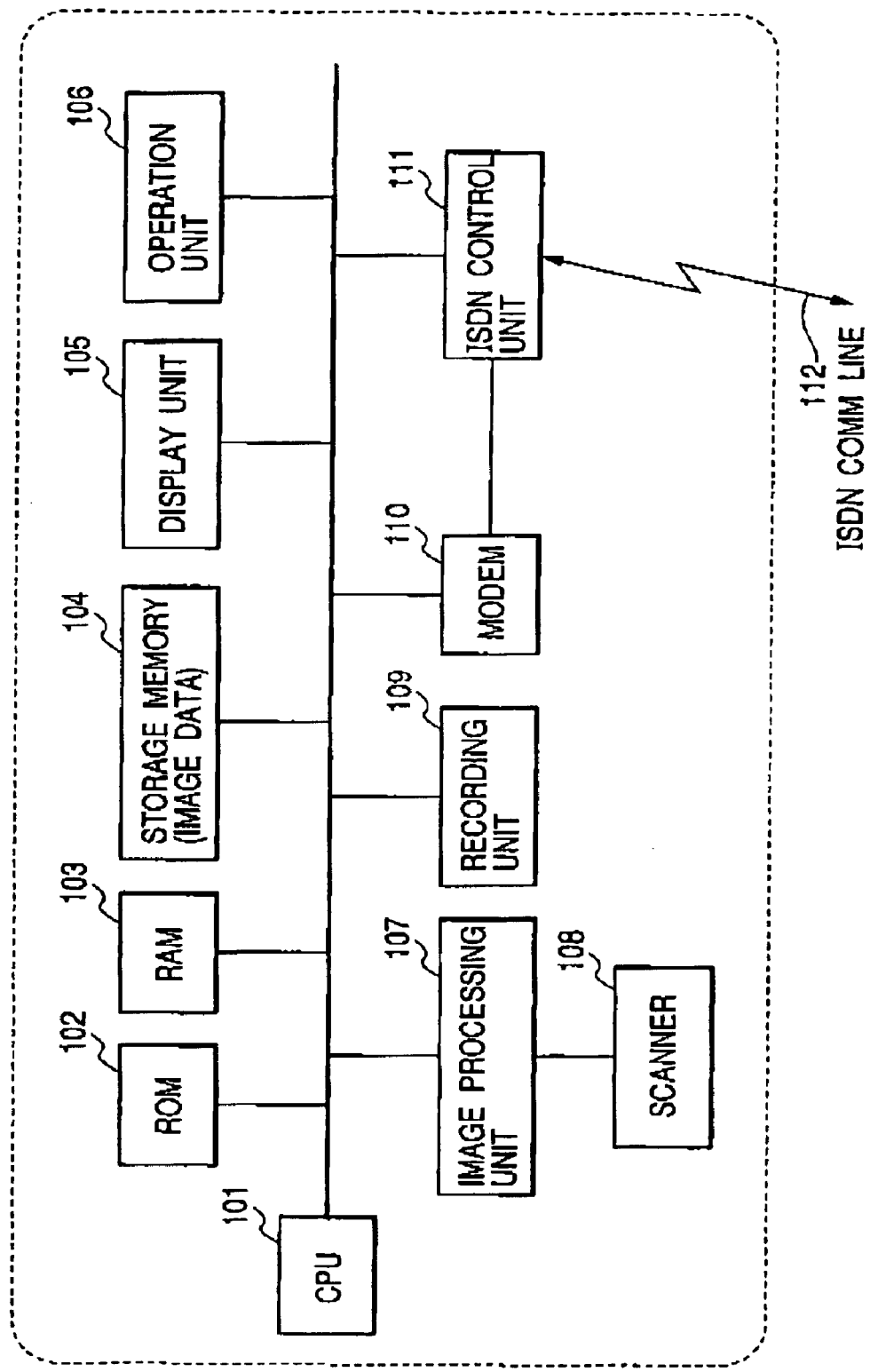
FIG. 1 is a block diagram showing one embodiment of the present invention.

FIG. 1 is a block diagram showing a configuration of a facsimile apparatus related to an embodiment of the present invention.

A CPU101 is a system control unit for controlling the apparatus as a whole. A ROM102 stores a control program for controlling the CPU101. The CPU101 and a part of the control program constitute a control means (control step), a decision means (decision step), and a setting means (setting step) in the present invention.

A RAM103 consists of an SRAM for storing program control variables, etc. It also stores settings registered by an operator, managing data of the apparatus, and various working buffers.

This RAM103 stores also values which are set by a setting means (setting step) for setting a stand-by time in the present invention. The setting means (setting step) may be specifically structured by a method of operator's entry through a keyboard of an operation unit 106 or a method that setting information is transferred from an external apparatus to the present facsimile apparatus via a predetermined interface or network and stored in the RAM103.

A storage memory 104 consists of a DRAM, etc. for storing image data. A display unit 105 consists of LCDS, LEDs, etc. for notifying a user of the display contents.

The operation unit 106 consists of the keyboard, a touch panel, etc. for permitting the operator to enter various information. An image processing unit 107 is used to perform correction processing on image data which is read in and output high-accuracy image data.

A scanner 108 consists of a CS image sensor, an original-carrier mechanism, etc. for reading out an original optically to convert it into electrical image data. A recording unit 109 consists of a printer for recording received images or file data on recording paper.

A MODEM110 modulates and demodulates reception/transmission signals in G3 ISDN communication. An ISDN control unit 111 performs transmission control in the D and B channels for ISDN communication via an ISDN communication line 112.

Figure 2:
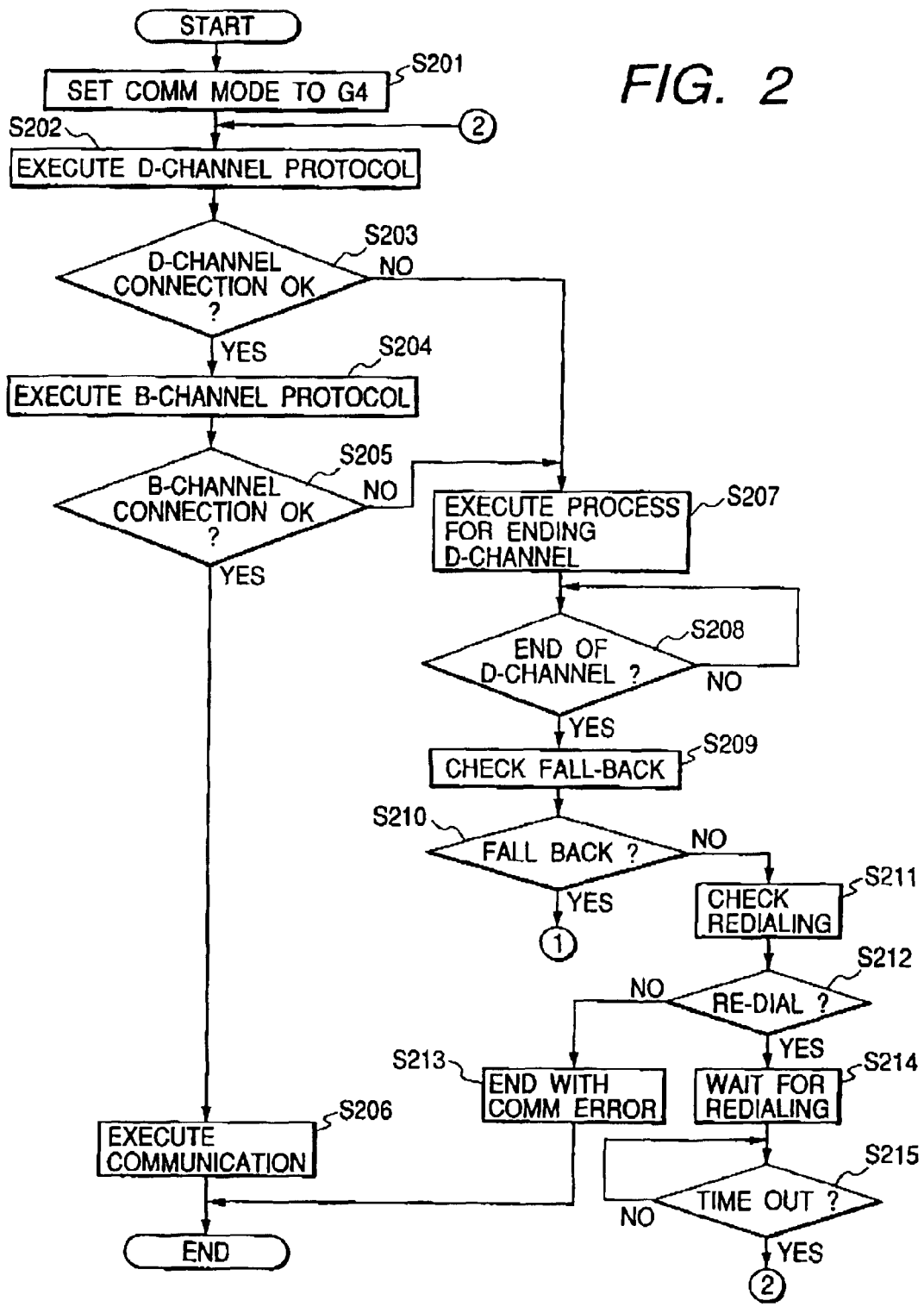
FIG. 2 is a flowchart showing operations of the above-mentioned embodiment.

FIG. 2 is a flowchart showing one example of the facsimile apparatus related to the present invention.

In FIG. 2, when an operator makes a call via the operation unit 106, the CPU101 sets an initial communication mode to G4 at S201.

Next, at S202, connection is tried in a communication mode set by using a call control procedure in the D channel. At S203, it is decided whether a D-channel connection procedure has succeeded at S202. When it decides a success at S203, a flow goes to S204 to perform B-channel connection.

At S205, it is decided whether a B-channel connection procedure has succeeded at S204. When it decides a success at S205, communication is conducted at S206 and the flow terminates.

If the decision results in failure at S203 or S205, the flow goes to S207 to perform D-channel termination processing. After the D-channel termination processing is ended (S208), it is decided whether a fall-back should be performed at S209 and S210.

This decision is made to estimate a reason for failure in connection and judge whether the fall-back is effective or not based on a reason such as a mismatch in communication mode.

If, for example, the connection has failed due to a busy state of the partner, the fall-back is not effective. In this case, the fall-back is not performed. If the fall-back has been repeated and any other communication mode is not available, the fall-back is impossible.

Such criterion are specified beforehand by the control program (stored as a program in the ROM102) or specified by the operation unit 106 by selection of a function mode, etc. (i.e., the criterion are input from the operation unit 106 and stored in the RAM103, thus permitting the CPU101 to decide the fall-back based on the criterion stored in the RAM103), for performing the above-mentioned decisions.

If it decides at S210 that the fall-back should not be performed, it is decided at S211 and S212 whether re-dialing should be performed or not. Specifically, it is here decided whether the number of re-dialing operations has already reached a predetermined value. If it is decided at S212 that re-dialing should not be performed, the communication terminates with a communication error at S213.

If it is decided at 5212 that re-dialing should be performed, the flow shifts to a re-dial stand-by state (S214) and waiting in executed there for a re-dial stand-by time stored in the RAM103 until the time-out (S215). After the time-out, the flow returns to S202 and goes on. For each redialing here, a counter for counting the number of re-dialing operations, move wants by one.

When it is decided at S210 that the fall-back should be performed, it is decided whether the current communication mode is G4. If it is G4, a re-calling communication mode is set to G3 (transmissibility: 3.1 kHz audio) and, otherwise, G3 (transmissibility; speech), and then the flow goes to S219. At S219, a timer (fall-back wait timer) for waiting for a time lapse stored in the RAM103 is started. As mentioned above, by operating the operation unit 106 beforehand, a stand-by time is stored in the RAM103. When the timer times out, the flow returns to S202 and goes on.

Although the above-mentioned operations are performed by the CPU101 based on the programs stored in the ROM102 and the RAM103, according to the present invention, such programs may be stored on a floppy disk, hard disk, optical disk, magneto-optical disk, CD-ROM, memory card, or any other external memory medium, which can be read out by a dedicated read-out apparatus and taken into a facsimile apparatus to be executed by the CPU101.

Although the above-mentioned embodiment has been described only with respect to a facsimile apparatus, the present invention can be applied also to a terminal that is used in communication of the same purpose as the above by using as occasion demands a plurality of B-channel protocols in the ISDN.

Although in the above-mentioned embodiment, a fall-back procedure is performed in an order of G4 to G3 (transmissibility: 3.1-kHz audio) and then to G3 (transmissibility: speech), the fall-back communication modes and the order are not limited to that embodiment.

FIG. 4 gives setting states of a re-dial timer and a fall-back timer stored in the RAM103. The re-dial timer is used at 5214 and S215 in FIG. 2, while the fall-back timer is used at S219 and S220 in FIG. 3. The re-dial timer can set therein the time of 2 to 10 minutes in units of one minute, while the fall-back timer can set therein the time of zero to 25.5 seconds in units of 100 ms. These settings may be given, as mentioned above, by the operator's key-in at the operation unit 106 or transferred from an external apparatus to the present facsimile apparatus via a predetermined interface or network and stored in the RAM103.

As described above, the present invention makes it possible to provide a timer for stand-by waiting for a predetermined time before re-calling by the use of a fall-back function, to enable effective re-calling even to such a partner apparatus, exchanger, or network that takes a long time in releasing processing, thus improving a rate of successful connection.

What is claimed is:

1. A communication apparatus connected to an ISDN which comprises:
    decision means for, when call connection fails, deciding a reason for the failure in connection;
    setting means for setting a timer value used to wait for a predetermined time after a line disconnection failure when the decision means decides a mismatch in communication mode; and
    control means adapted for waiting for the predetermined time in response to the decision of a mismatch in communication mode made by the decision means, and then switching the communication mode to another communication mode to try the call connection again.

2. The communication apparatus according to claim 1, wherein
    the setting means sets, differently from the timer value, a second timer value used to wait for a second predetermined time when the decision means decides that a partner is busy; and
    the control means is adapted to wait for the second predetermined time when the decision means decides that the partner is busy, and then tries the call connection again without switching the communication mode.

3. A communication apparatus connected to an ISDN, having a plurality of communication protocols in a B channel, said apparatus including D-channel control means for controlling a call in a D channel, and a plurality of B-channel control means for conducting protective controls corresponding to a plurality of communication modes in the B channel, said apparatus comprising:
    decision means for, when call connection by the D-channel control means fails, deciding whether or not call connection should be tried by the D-channel control means again after switching a communication mode in the B channel to another communication mode;
    timer control means for waiting for a predetermined time after a line disconnection failure when the decision means decides that the call connection should be tried by the D-channel control means again after the switching to such another communication mode in the B channel; and
    control means adapted for switching to said another communication mode in the B channel after waiting for a predetermined time by the timer control means to try the call connection again by the D-channel control means.

4. The communication control apparatus according to claim 3, further comprising setting means for setting a time for waiting by the timer control means, when the communication mode is switched to another communication mode in the B channel and it is decided that the call connection should be tried again by the D-channel control means.

5. A communication method in an ISDN, comprising the steps of:
    when call connection fails, deciding a reason for the failure in connection;
    setting a timer value used to wait for a predetermined time after a line disconnection failure when the decision step decides a mismatch in communication mode; and
    controlling adapted for waiting for the predetermined time in response to the decision of a mismatch in communication mode made in the decision step, and then switching the communication mode to another communication mode to try the call connection again.

6. The communication method according to claim 5, wherein the setting step sets, differently from the timer value, a second timer value used to wait for a second predetermined time when the decision step decides that a partner is busy; and the control step is adapted to wait for the second predetermined time when the decision step decides that the partner is busy, and then tries the call connection again without switching the communication mode.

7. A communication method in an ISDN, having a plurality of communication protocols in a B channel, said method including a D-channel control step for controlling a call in a D channel, and a B-channel control step for conducting control corresponding to each of a plurality of communication modes in the B channel, said method comprising the steps of:

when call connection by the D-channel control step fails, deciding whether or not call connection should be tried in the D-channel control step again after switching a communication mode in the B channel to another communication mode;

controlling a timer for waiting for a predetermined time after a line disconnection failure when the decision step decides that the call connection should be tried in the D-channel control step again after the switching to such another communication mode in the B channel; and controlling adapted for switching to said another communication mode in the B channel after waiting for a predetermined time in the timer control step to try the call connection again by the D-channel control step.

8. The communication method according to claim 7, further comprising the step of setting a time for waiting in the timer control step, when the communication mode is switched to another communication mode in the B channel and it is decided that the call connection should be tried again in the D-channel control step.

9. A storage medium to store a computer program for the implementation of a communication method in an ISDN, comprising the steps of:

when call connection fails, deciding a reason for the failure in connection; setting a timer value used to wait for a predetermined time after a line disconnection failure when the decision step decides a mismatch in communication mode; and controlling adapted for waiting for the predetermined time in response to the decision of a mismatch in communication mode made in the decision step, and then switching the communication mode to another communication mode to try the call connection again.

10. The storage medium according to claim 9, wherein the setting step sets, differently from the timer value, a second timer value used to wait for a second predetermined time when the decision step decides that a partner is busy; and the control step is adapted to wait for the second predetermined time when the decision step decides that the partner is busy, and then tries the call connection again without switching the communication mode.

11. A storage medium to store a computer program for the implementation of a communication method in an ISDN, having a plurality of communication protocols in a B channel, said method including a D-channel control step for controlling a call in a D channel, and a B-channel control step for conducting control corresponding to each of a plurality of communication modes in the B channel, said method comprising the steps of:

when call connection by the D-channel control step fails, deciding whether or not call connection should be tried in the D-channel control step again after switching a communication mode in the B channel to another communication mode;

controlling a timer for waiting for a predetermined time after a line disconnection failure when the decision step decides that the call connection should be tried in the D-channel control step again after the switching to such another communication mode in the B channel; and controlling adapted for switching to said another communication mode in the B channel after waiting for a predetermined time in the timer control step to try the call connection again by the D-channel control step.

12. The storage medium according to claim 11, further comprising the step of a setting a time for waiting in the timer control step, when the communication mode is switched to another communication mode in the B channel and it is decided that the call connection should be tried again in the D-channel control step.

* * * * *

UNITED STATES PATENT AND TRADEMARK OFFICE
CERTIFICATE OF CORRECTION

PATENT NO. : 6,891,861 B1
DATED : May 10, 2005
INVENTOR(S) : Masahiro Odaira

It is certified that error appears in the above-identified patent and that said Letters Patent is hereby corrected as shown below:

Column 3,
Line 11, "5212" should read -- S212 --; and
Line 51, "5214" should read -- S214 --.

Signed and Sealed this

Tenth Day of January, 2006

JON W. DUDAS
*Director of the United States Patent and Trademark Office*